United States Patent
Holzwarth et al.

(10) Patent No.: US 11,149,699 B2
(45) Date of Patent: Oct. 19, 2021

(54) FILTER ELEMENT FOR AN ENGINE AIR FILTER ASSEMBLY HAVING A NONWOVEN PRE-FILTER AND RELATED METHOD

(71) Applicant: MANN+HUMMEL GmbH, Ludwigsburg (DE)

(72) Inventors: Marcel Holzwarth, Fayetteville, NC (US); Jerome Stiger, Kalamazoo, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 275 days.

(21) Appl. No.: 16/209,181

(22) Filed: Dec. 4, 2018

(65) Prior Publication Data
US 2020/0173403 A1   Jun. 4, 2020

(51) Int. Cl.
| | |
|---|---|
| *F02M 35/024* | (2006.01) |
| *B01D 46/00* | (2006.01) |
| *B01D 46/10* | (2006.01) |
| *B01D 46/52* | (2006.01) |

(52) U.S. Cl.
CPC ... *F02M 35/02458* (2013.01); *B01D 46/0005* (2013.01); *B01D 46/10* (2013.01); *B01D 46/521* (2013.01); *F02M 35/0245* (2013.01); *F02M 35/02425* (2013.01); *F02M 35/02491* (2013.01); *B01D 2239/0618* (2013.01); *B01D 2239/0681* (2013.01)

(58) Field of Classification Search
CPC .. B01D 46/10; B01D 46/0005; B01D 46/521; B01D 46/001; B01D 2239/0618; B01D 2239/0681; B01D 2271/022; B01D 2275/10; F02M 35/02458; F02M 35/02425; F02M 35/0245; F02M 35/02491; F02M 35/02408; F02M 35/02416
See application file for complete search history.

(56) References Cited

U.S. PATENT DOCUMENTS

| | | | |
|---|---|---|---|
| 9,359,982 B2 | 6/2016 | Oh | |
| 2013/0167490 A1* | 7/2013 | Barron | B01D 46/10 55/309 |
| 2014/0260143 A1* | 9/2014 | Kaiser | B01D 46/10 55/501 |
| 2017/0368490 A1* | 12/2017 | Wall | B01D 46/0005 |

FOREIGN PATENT DOCUMENTS

| | | |
|---|---|---|
| DE | 20301643 U1 | 6/2004 |
| DE | 102009033262 A1 | 1/2011 |
| EP | 0215191 B1 | 3/1987 |
| EP | 1391233 B1 | 2/2004 |

* cited by examiner

*Primary Examiner* — Lucas A Stelling
*Assistant Examiner* — Hafiz Muhammad Aamir (57) ABSTRACT

A filter element for an air filter assembly of an engine includes a primary filter media and a secondary filter media. The primary filter media has a plurality of pleats having first fold edges on an inlet face of the primary filter media and second fold edges on an outlet face of the primary filter media. The first and second fold edges extend from a first lateral side to a second lateral side of the primary filter media. The secondary filter media is constructed of a nonwoven material and includes a first portion arranged on the inlet face of the primary filter media, a second portion secured to the first lateral side of the primary filter media, and a third portion secured to the second lateral side of the primary filter media.

15 Claims, 6 Drawing Sheets

FILTER ELEMENT FOR AN ENGINE AIR FILTER ASSEMBLY HAVING A NONWOVEN PRE-FILTER AND RELATED METHOD

FIELD

The present disclosure relates to the filtering of air delivered to an engine of a motor vehicle. More particularly, the present disclosure relates to a filter element for an engine air filter assembly having a nonwoven pre-filter. The present disclosure also relates to a method of assembling an engine air filter assembly.

BACKGROUND

The statements in this section merely provide background information related to the present disclosure and may not constitute prior art.

Various types of engine air filter assemblies are known. One such assembly is shown and described in commonly assigned U.S. Pat. No. 9,359,982. This type of assembly includes a pleated filter element. The pleated filter element is mounted within a filter chamber of a housing. Air enters the housing through an inlet port, is filtered by the pleated filter element, and exits the housing through an outlet port. In some such assemblies, a pre-filter element such as a non-woven filter element is included within the housing to further filter the air. The pre-filter element may be secured to an inlet face of the pleated filter element.

While known filter elements for engine air filter assemblies may work for their intended purposes, a continuous need for improvement in the relevant art remains.

SUMMARY

In accordance with one particular aspect, the present disclosure relates to a filter element for an air filter assembly of an engine. The filter element includes a primary filter media and a secondary filter media. The primary filter media has a plurality of pleats having first fold edges on an inlet face of the primary filter media and second fold edges on an outlet face of the primary filter media. The fold edges extend from a first lateral side to a second lateral side of the primary filter media. The secondary filter media is constructed of a non-woven material and includes a first portion arranged on the inlet face of the primary filter media, a second portion secured to the first lateral side of the primary filter media, and a third portion secured to the second lateral side of the primary filter media.

In accordance with another particular aspect, the present disclosure relates to an engine air filter assembly including a housing and a filter element. The housing has a first housing portion and a second housing portion. The first housing portion defines a filter element opening. The filter element is received in filter element opening and is operative for filtering air delivered to the engine. The filter element includes a primary filter media and a secondary filter media. The primary filter media has a plurality of pleats with first fold edges on an inlet face of the primary filter media and second fold edges on an outlet face of the primary filter media. The first and second fold edges extend from a first lateral side to a second lateral side of the primary filter media. The secondary filter media is constructed of a non-woven material and includes a first portion arranged adjacent the intake face of the primary filter media, a second portion secured to the first lateral side of the primary filter media, and a third portion secured to the second lateral side of the primary filter media. The second and third portions of the secondary filter assembly are compressed between the primary filter media and the first portion of housing.

In accordance with yet another particular aspect, the present disclosure relates to a method of assembling the engine air filter assembly. The method includes securing a first portion of the secondary filter material to an intake face of a primary filter material with at least a first glue bead. The method additionally includes securing a second portion of the secondary filter material to a first lateral side of the primary filter material with at least a second glue bead. The method further includes securing a third portion of the secondary filter material to a second lateral side of the primary filter material with at least a third glue bead.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
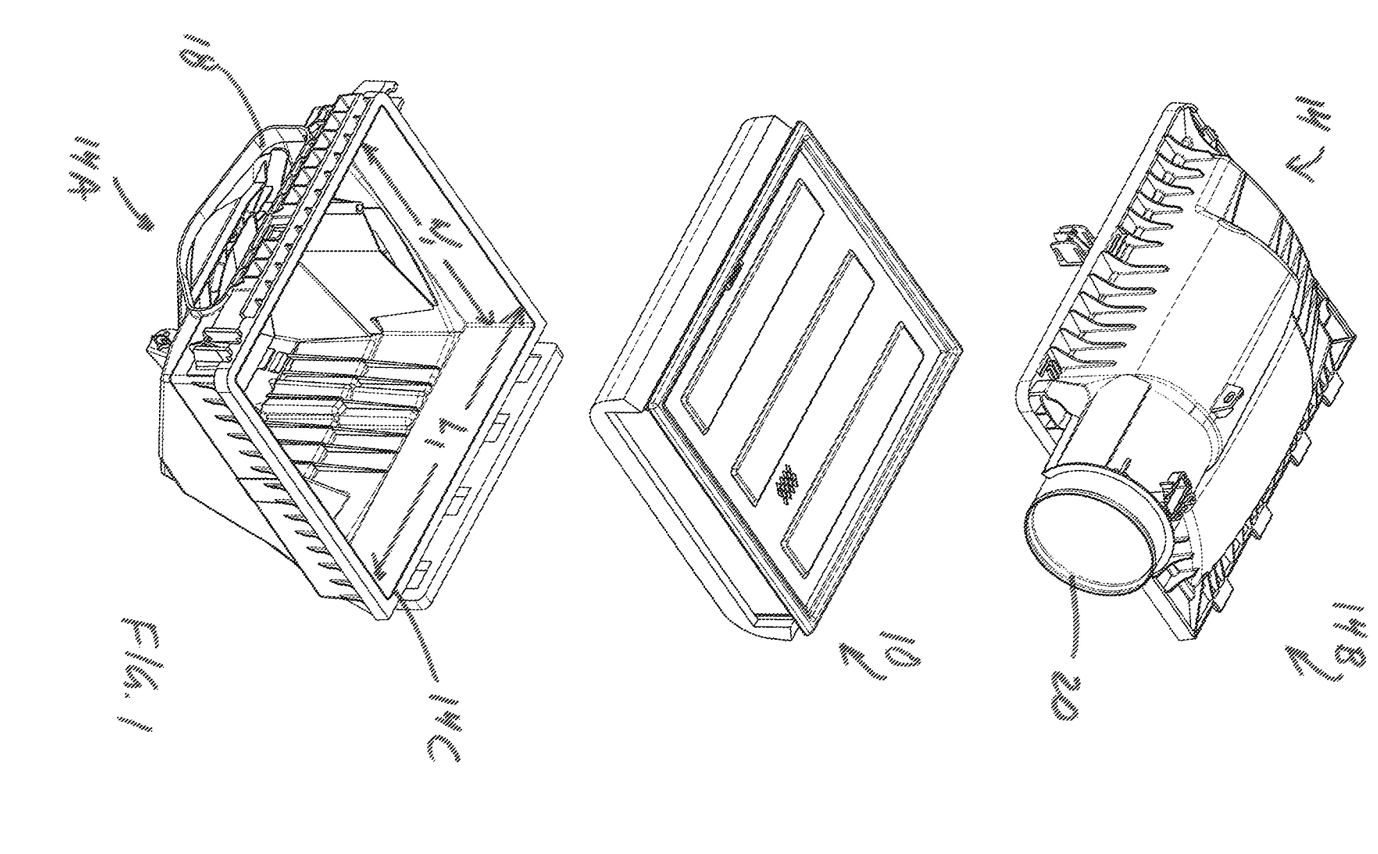
FIG. 1 is a perspective view of a filter element of an air filter assembly for an engine in accordance with the present teachings, the filter element shown operatively associated with first and second housing portions of the air filter assembly.
Figure 1A:
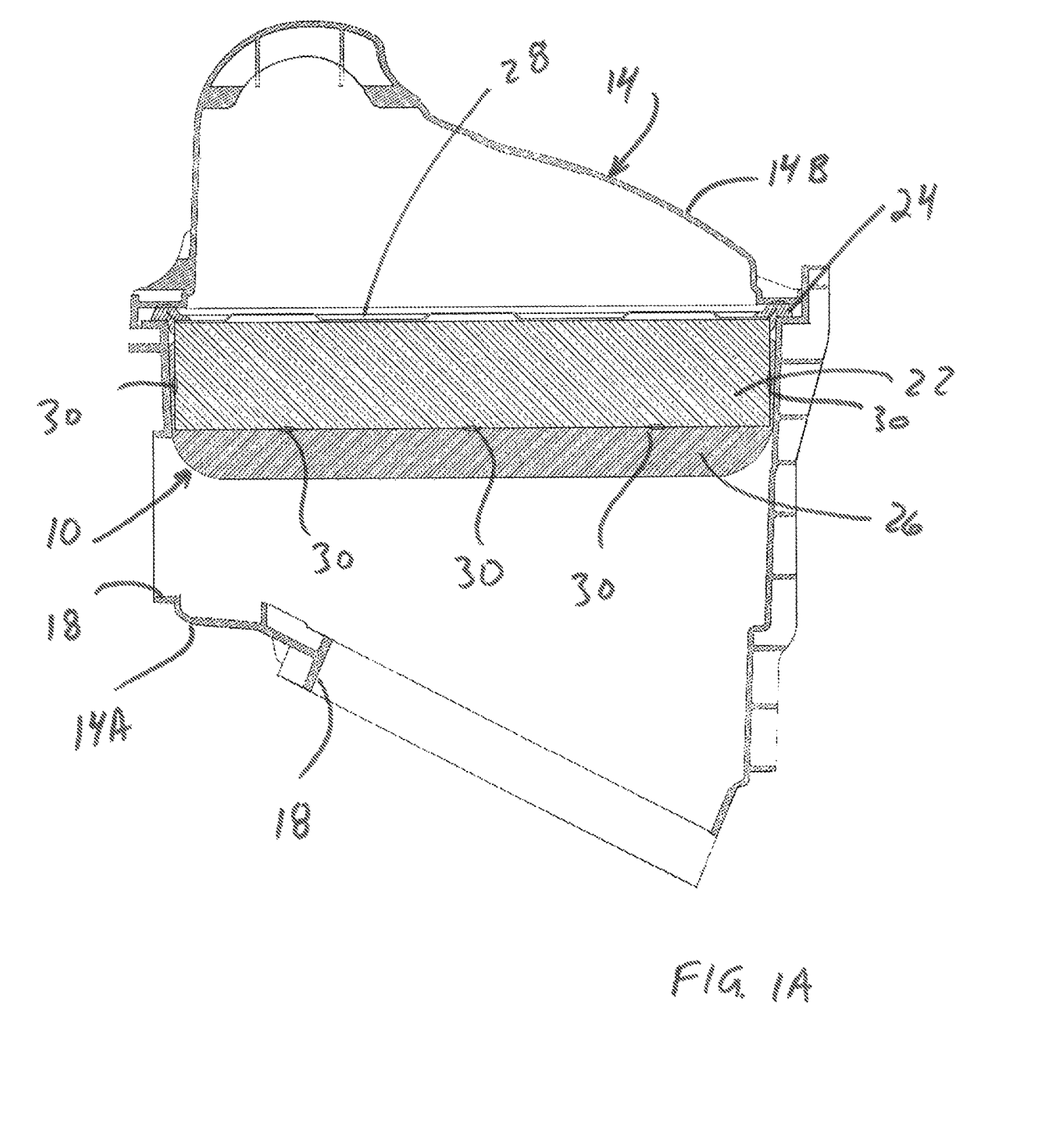
FIG. 1A is a cross-sectional view taken through the air filter assembly of FIG. 1.

Referring first to the exploded perspective view of FIG. 1 and the cross-sectional view of FIG. 1A, a filter element in accordance with the present teachings is shown and generally identified with reference character 10. The filter element 10 is part of an air filter assembly 12 for the filtering of air delivered to an engine of a motor vehicle. The filter element 10 is shown operatively associated with a housing 14 of the air filter assembly 12. Explaining further, the filter element 10 is adapted to be received within a first housing portion or lower housing portion 14A of the housing 14.

The housing 14 also includes a second or upper housing portion 14B that may be secured to the first housing portion 14A in any manner well known in the art. One suitable manner of securing the first housing portion 14A and the second housing portion 14B is shown and described in U.S. Pat. No. 9,359,982, which is hereby incorporated by reference as if fully set forth herein. The first and second housing portions 14A and 14B may be formed of injection molded plastic, nylon, fiberglass reinforced plastic or other non-porous moldable materials known to those skilled in the art.

The first housing portion 14A has a sidewall 14C define a filter element opening 16 generally corresponding in shape with the filter element 10 for receiving the filter element 10. In the embodiment illustrated, the filter element opening 16 defined by the sidewall 14C of the first housing portion 14A is generally rectangular. In this regard, the opening 16 has a length $L_1$ and a width $W_1$. As shown, the length $L_1$ is greater than the width $W_1$. It will be appreciated, however, that the width $W_1$ may be equal to or greater than the length $L_1$ within the scope of the present teachings. In one particular application, the filter element opening 16 for receiving the filter element 10 is has a length $L_1$ of approximately 300 mm and a width $W_1$ of approximately 275 mm.

In a known manner, the first housing portion 14A includes at least one first port 18 and the second housing portion 14B includes at least one second port 20. The first port may be considered as an inlet port 18 for receiving air to be filtered and the second port may be considered as an air outlet port 20 for discharging filtered air. It will be understood, however, that the designations of the inlet and outlet ports may be interchanged in other applications without deviating from the scope of the present teachings.

Figure 2:
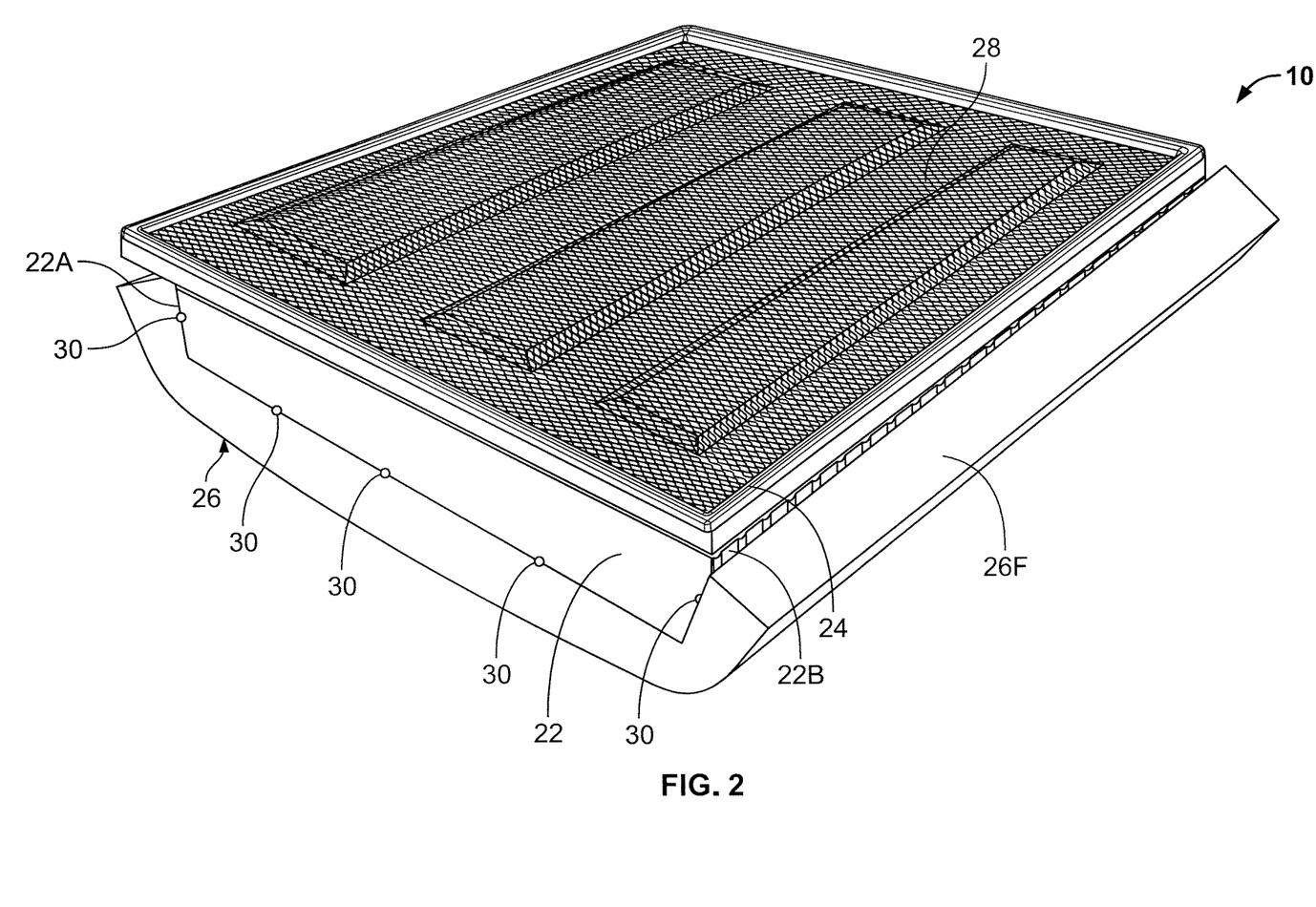
FIG. 2 is a top perspective view of the filter element of the present teachings.
Figure 3:
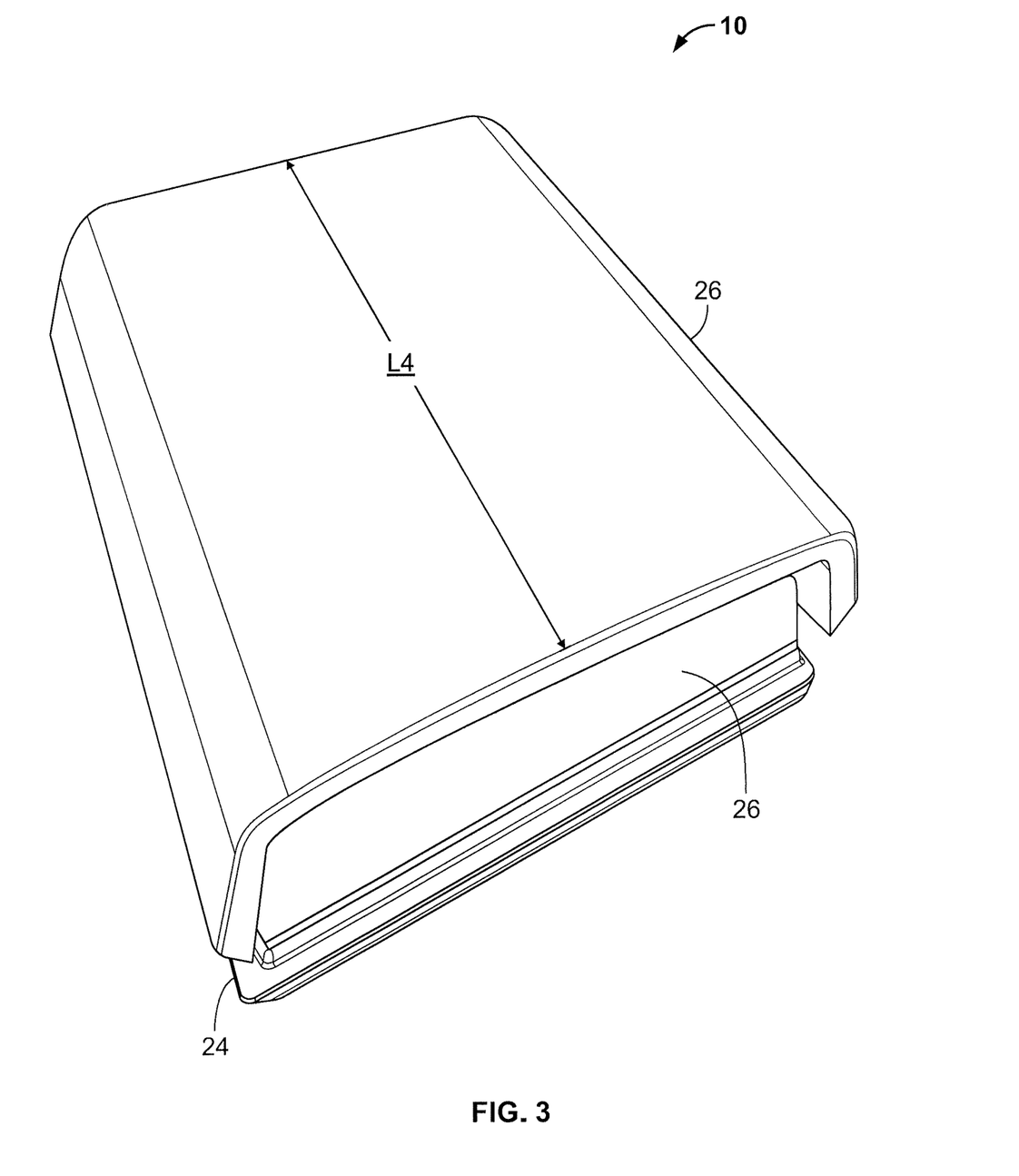
FIG. 3 is a bottom perspective view of the filter element of the present teachings.
Figure 4:
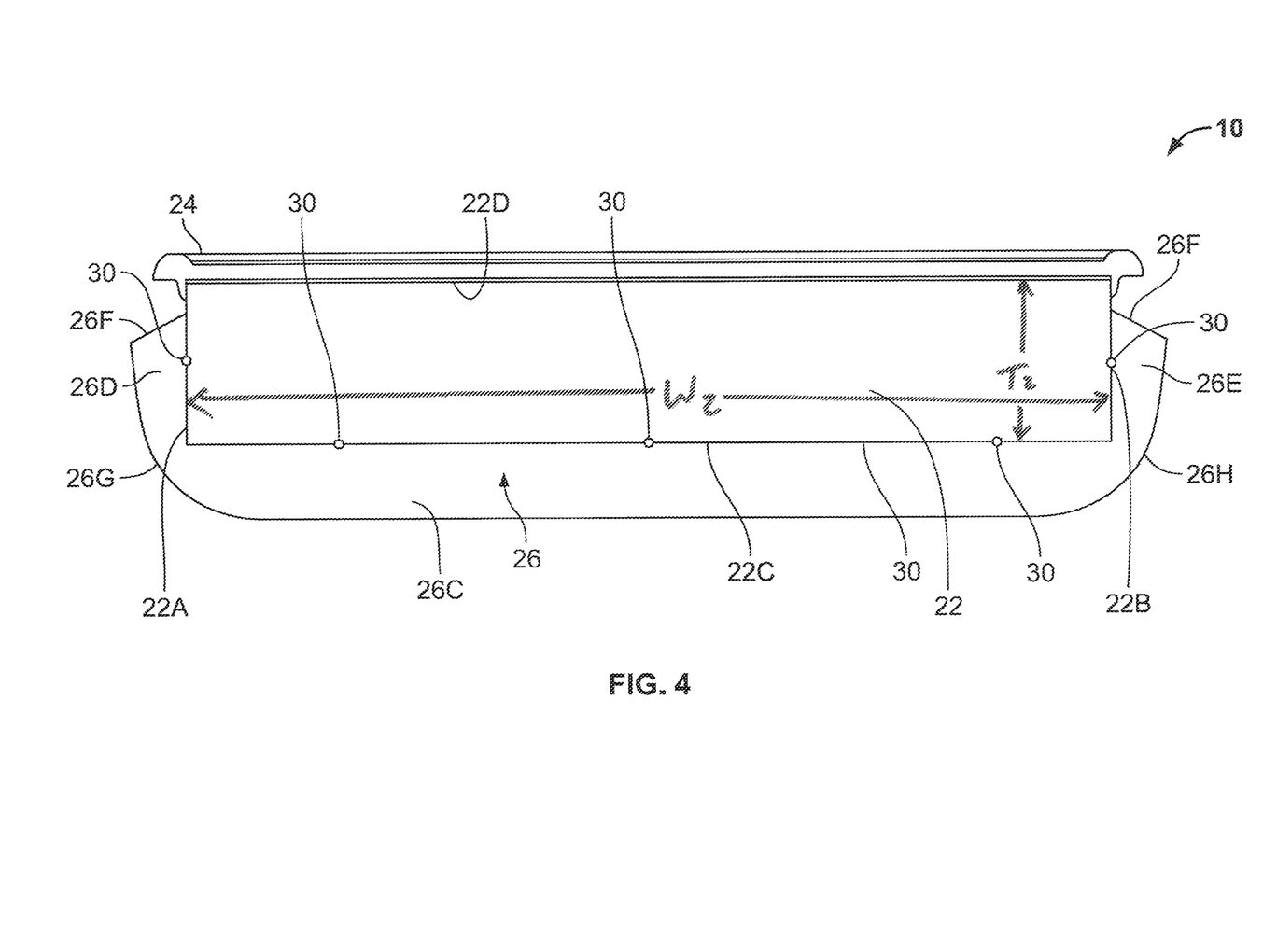
FIG. 4 is an end view of the filter element of the present teachings.

With continued reference to FIGS. 1 and 1A and additional reference to FIGS. 2 through 4, the filter element 10 of the present teachings will be further described. The filter element 10 is shown to generally include a primary filter media 22, and a secondary filter media or pre-filter 26. The primary filter media 22 may be a pleated filter media having a plurality of pleats extending between first and second lateral sides 22A and 22B of the primary filter media 22. The pleats of the plurality of pleats include first fold edges of an inlet face or inlet side 22C of the primary filter media 22 and second fold edges on an outlet face or outlet side 22D of the primary filter media 22.

As illustrated, the primary filter media 22 may be generally rectangular in shape. The primary filter media 22 includes a width $W_2$ extending between the first and second lateral sides 22A and 22B, a length perpendicular thereto, and a thickness $T_2$. As shown, the length is greater than the width $W_2$. It will be appreciated, however, that the width $W_2$ may be equal to or greater than the length within the scope of the present teachings. In one particular application, the primary filter media 22 may have a length of approximately 293.5 mm, and a width $W_2$ of approximately 268.5 mm, and a thickness $T_2$ of approximately 48 mm. It will also be appreciated that the primary filter media 22 may be non-rectangular in other applications consistent with the present teachings. While a pleated filter media 22 is shown and described, other filter media types may be used in connection with certain aspects of the present teachings without deviating from the scope of the present disclosure.

The filter element 10 may also include a peripheral seal 24 of elastic material molded to the primary filter media 22. As shown, the peripheral seal 24 may peripherally surround the outlet face 22D of the primary filter media 22. Accordingly, the peripheral seal 24 has a shape generally corresponding to the shape of the primary filter media 22. In the embodiment illustrated, the peripheral seal has a rectangular shape with a length and a width. Again, the length is greater than the width. As above, it will be appreciated that the width may be equal to or greater than the length within the scope of the present teachings. In one particular application, the peripheral seal 24 may have a length of approximately 314 mm and a width of approximately 289 mm.

The length of the peripheral seal 24 is greater than the length $L_1$ of the filter element opening 16 and the width of the peripheral seal 24 is greater than the width $W_1$ of the filter element opening 16. In this manner, the peripheral seal 24 overhangs an upper edge of the first housing portion 14A that defines the filter element opening 16 and the peripheral seal 24 may be captured between the first and second housing portions to seal an interior of the housing 14 and define a filter chamber extending between the inlet and outlet ports. The peripheral seal 24 may be formed of a foamed polyurethane or any other suitable materials.

As illustrated, the filter element 10 may also include a support member 28 for counteracting forces introduced in the primary filter media 22 by a flow of fluid through the primary filter media 22. The support member 28 may be constructed of metal, plastic or other suitable material. The support member 28 may define a grid or mesh with a plurality of openings to allow the passage of filtered air. The support member 28 may be stamped to define a plurality of rectangular regions.

The support member 28 may be secured to the primary filter media 22 by the peripheral seal 24. Explaining further, the support member 28 may have a peripheral edge embedded in the peripheral seal 24. The support member 28 may be disposed adjacent to the outlet face 22D of the primary filter media 22 and provide an additional degree of structural integrity for the filter element 10.

The secondary filter media 26 of the filter element 10 may be a non-woven fleece. In certain applications, the secondary filter media 26 may include a first side or dirty side 26A (e.g., outwardly facing) having a first porosity and a second side or clean side 26B (inwardly facing) having a second, lesser porosity. The secondary filter media 26 may be constructed from a single sheet of non-woven fleece and may have a rectangular shape with a length $L_4$, a width $W_4$ and an uncompressed thickness $T_4$. Again, the length $L_4$ is greater than the width $W_4$. As above, it will be appreciated that the width $W_4$ may be equal to or greater than the length $L_4$ within the scope of the present teachings. In the application described herein, the single sheet of non-woven fleece 26 may have a length $L_4$ of approximately 344 mm, a width $W_4$ of approximately 310 mm and an uncompressed thickness $T_4$ of approximately 22 mm.

As perhaps best shown in the end view of FIG. 4, the secondary filter media 26 includes a first portion 26C attached to the inlet face 22C of the primary filter media 22, a second portion 26D attached to the first lateral side 22A of the primary filter media 22, and a third portion 26E attached to the second lateral side 22B of the primary filter media 22. The secondary filter media 26 wraps around the lower corners of the primary filter media 22 at the junctures of the inlet face 22C and the first and second lateral sides 22A and 22B, respectively.

A method of assembling the filter element 10 of the present teachings will be described with particular reference to FIGS. 5A-5C. In the embodiment illustrated, the secondary filter media 26 may be attached to the primary filter media 22 with a plurality of glue beads 30. At least one glue bead 30 is used to attach each of the first, second and third portions 26C, 26D and 26E to the primary filter media 22. The glue beads 30 may extend along the respective lengths of the secondary filter media 26 and the primary filter media 22.

In one particular application, a single glue bead 30 may be used to secure the second portion 26D of the secondary filter media 26 to the primary filter media 22, a single glue bead 30 may be used to secure the third portion 26E of the secondary filter media 26 to the primary filter media 22, and a three parallel glue beads 30 may be used to secure the first portion 26C of the secondary filter media 26 to the primary filter media 22. It will be understood, however, that a greater or lesser number of glue beads 30 may be employed within the scope of the present teachings.

The second portion 26D of the secondary filter media 26 upwardly extends substantially along the first lateral side 22A of the primary filter media 22 and terminates proximate the peripheral seal 24. Similarly, third portion 26E of the peripheral seal 24 upwardly extends substantially along the second lateral side 22B of the primary filter media 22 and terminates proximate the peripheral seal 24. The lateral edges 26F of the secondary filter media 26 taper downwardly as they extend away from the first and second lateral sides 22A and 22B of the primary filter media 22. Rounded corners 26G and 26H are defined at the junctions between the first portion of the secondary filter media 26 and the second and third portions of the secondary filter media 26. As will be discussed below, the tapered lateral edges 26F of the secondary filter media 26 avoids pinching of the secondary filter media 26 between the housing 14 and the peripheral seal 24 and the rounded corners 26G and 26H of the secondary filter media define lead-in surfaces to facilitate insertion of the filter element 10 into the housing 14.

Figure 5A:
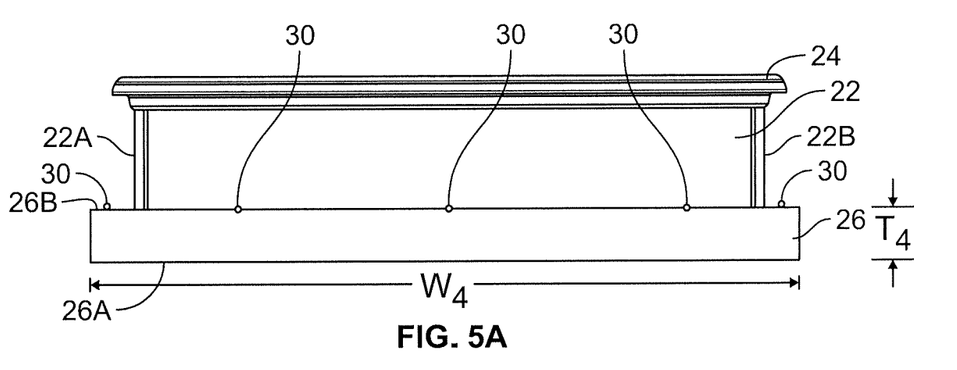
FIGS. 5A-5C is a series of simplified views illustrating a method of assembling a filter element of an air filter assembly for an engine in accordance with the present teachings.
Figure 5B:
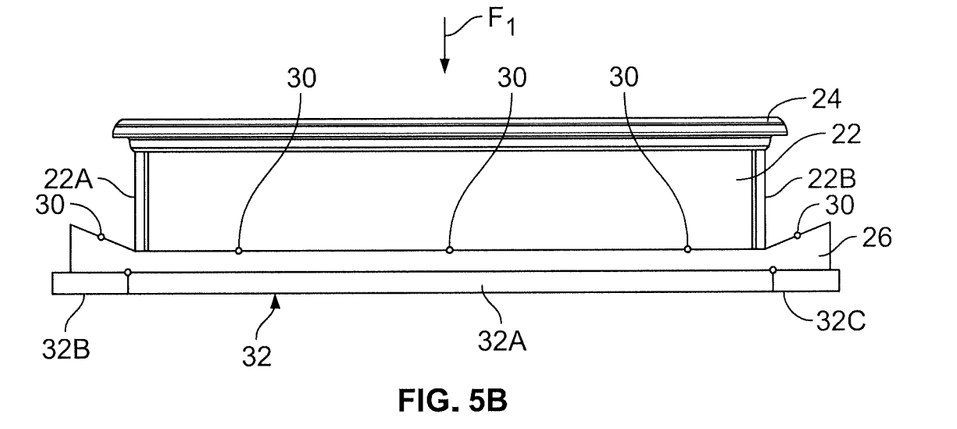
Figure 5C:
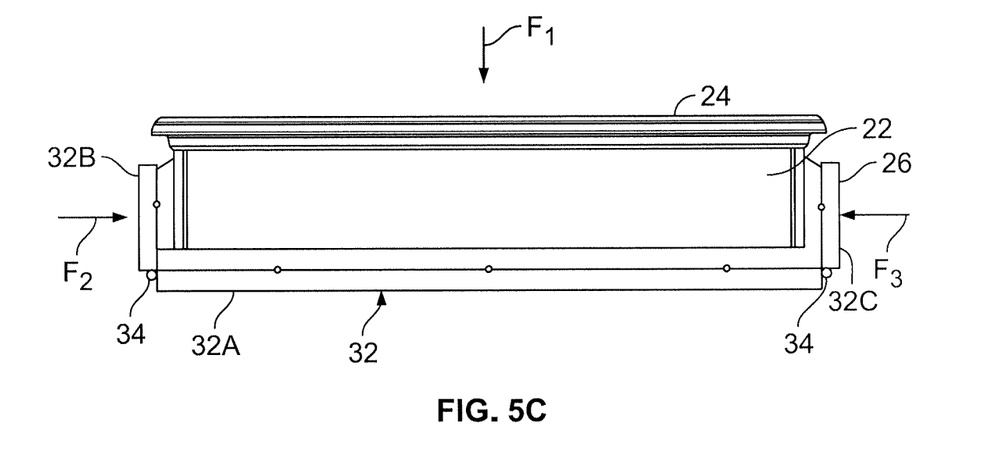

With continued reference to FIGS. 1 through 4 and additional reference to FIGS. 5A through 5C, a method of assembling an air filter assembly of the present teachings will be further detailed. Glue beads 30 are applied to one of the primary filter media 22 and the secondary filter media 26. In the embodiment illustrated, the glue beads are applied to the secondary filter media 26. The primary filter media 22 is placed upon the secondary filter media 26 such that the glue beads 30 on the first portion 26C of the secondary filter media 26 contact the inlet face 22C of the primary filter media 22. Explaining further, the glue beads 30 contact the first folds of the pleats of the plurality of pleats of the primary filter media 22.

A first force $F_1$ is applied in a first direction to compress the first portion 26C of the secondary filter media 26 against the inlet face 22C of the primary filter media 22. A second force $F_2$ is applied in a second direction (perpendicular to the first direction) to compress the second portion 26D of the secondary filter media 26 against the first lateral side 22A of the primary filter media 22. A third force $F_3$ is applied in a third direction (perpendicular to the first direction and parallel to the second direction) to compress the third portion 26E of the secondary filter media 26 against the second lateral side 22B of the primary filter media 22.

A hinged table or plate 32 may be used to apply the forces $F_1$, $F_2$ and $F_3$. The hinged plate 32 may include a central portion 32A and first and second lateral side portions 32B and 32C. The first and second lateral side portions 32B and 32C may pivot about hinges 34 from first positions (see FIG. 5B) to second positions (see FIG. 5C). The forces $F_1$, $F_2$ and $F_3$ are maintained until the glue beads are sufficiently cured.

When the forces $F_1$, $F_2$ and $F_3$ are removed, the inherent elasticity of the secondary filter media 26 allows the secondary filter media 26 to rebound to its uncompressed thickness. Resultantly, the secondary filter media 26 includes the first and second lateral edges 26F between the inwardly facing side and the outwardly facing side of the secondary filter media 26. The first and second lateral edges 26F taper downwardly away from the respective one of the first and second lateral sides 22A and 22B of the primary filter media 22. Additionally, the secondary filter media 26 defines first and second rounded corners 26G and 26H at the first junction between the inlet face 22C and the first lateral side 22A and the second junction between the inlet face 22C and the second lateral side 22B.

After the glue beads 30 are further cured, the filter element 10 is inserted into the filter element opening 16 of the first housing portion 14A of the housing 14. The rounded corners 26G and 26H define lead in surfaces to assist in the insertion. The second and third portions 26D and 26E of the secondary filter media 26 are compressed between the housing 14 and the primary filter media 22.

As shown in FIG. 1A, the peripheral seal 24 is captured between the first and second housing portions 14A and 14B. The secondary filter media 26 is spaced from the peripheral seal 24 such that a gap is defined therebetween. This spacing and the tapered lateral edges 26F of the secondary filter media 26 help ensure that the secondary filter media 26 is not pinched between the peripheral seal 24 and the housing 14.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A filter element for an air filter assembly of an engine, the filter element comprising:
   a primary filter media having a plurality of pleats with first fold edges on an inlet face of the primary filter media and second fold edges on an outlet face of the primary filter media, the first and second fold edges extending from a first lateral side to a second lateral side of the primary filter media;
   a secondary filter media constructed of a non-woven material, the secondary filter media including a first portion arranged on the inlet face of the primary filter media, a second portion secured to the first lateral side of the primary filter media, and a third portion secured to the second lateral side of the primary filter media; and
   wherein the secondary filter media includes first and second lateral edges between an inwardly facing side and an outwardly facing side of the secondary filter media, the first and second lateral edges tapering downwardly away from the respective one of the first and second lateral sides of the primary filter media.

2. The filter element of claim 1, wherein each of the first, second and third portions of the secondary filter media is secured to the primary filter media with at least one glue bead.

3. The filter element of claim 1, further comprising a peripheral seal of elastic material molded to the primary filter media, the peripheral seal molded onto the primary filter media so as to peripherally surrounding the outlet face of the primary filter media.

4. The filter element of claim 3, wherein the peripheral seal is a foamed polyurethane.

5. The filter element of claim 1, wherein the second portion of the secondary filter media extends from the inlet face towards the outlet face to at least substantially cover the first lateral side of the primary filter media and the third portion of the secondary filter media extends from the inlet face towards the outlet face to at least substantially cover the second lateral side of the primary filter media.

6. The filter element of claim 1, wherein the secondary filter media defines first and second rounded corners at a first junction between the lower side and the first lateral side and a second junction between the lower side and the second lateral side.

7. The filter element of claim 3, further comprising a support member adjacent the outlet face of the primary filter media, the having a peripheral edge embedded in the peripheral seal, the support member operative to counteract forces introduced in the primary filter media by a flow of fluid through the primary filter media.

8. The filter element of claim 1, in combination with the air filter assembly, the air filter assembly including a housing having a first housing portion defining an opening receiving the filter element, the second and third portions of the secondary filter media is compressed between the primary filter media and the housing.

9. The engine air filter assembly of claim 7, further comprising a peripheral seal of elastic material molded to the primary filter media, the peripheral seal molded onto the primary filter media so as to peripherally surrounding the outlet face of the primary filter media, the peripheral seal captured between the first and second housing portions.

10. The engine air filter assembly of claim 9, wherein the annular seal is a foamed polyurethane.

11. The engine air filter assembly of claim 9, further comprising a support member adjacent the outlet face of the primary filter media, the support member having a peripheral edge embedded in the peripheral seal, the support member operative to counteract forces introduced in the primary filter media by a flow of fluid through the primary filter media.

12. The engine air filter assembly of claim 9, wherein each of the first, second and third portions of the secondary filter media is secured to the primary filter media with at least one glue bead.

13. The engine air filter assembly of claim 9, wherein the second portion of the secondary filter media extends from the inlet face towards the outlet face to at least substantially cover the first lateral side of the primary filter media and the third portion of the secondary filter media extends from the inlet face towards the outlet face to at least substantially cover the second lateral side of the primary filter media.

14. The engine air filter assembly of claim 7, wherein the secondary filter media defines first and second rounded corners at a first junction between the lower side and the first lateral side and a second junction between the lower side and the second lateral side;
wherein the secondary filter media includes first and second lateral edges between an inwardly facing side and an outwardly facing side of the secondary filter media, the first and second lateral edges tapering downwardly away from the respective one of the first and second lateral sides of the primary filter media.

15. An engine air filter assembly comprising:
a housing having a first housing portion and a second housing portion, the first housing portion defining a filter element opening; and
a filter element received in filter element opening for filtering air delivered to the engine, the filter element including a primary filter media and a secondary filter media, the primary filter media having a plurality of pleats with first fold edges on an inlet face of the primary filter media and second fold edges on an outlet face of the primary filter media, the first and second fold edges extending from a first lateral side to a second lateral side of the primary filter media, the secondary filter media constructed of a non-woven material, the secondary filter media including a first portion arranged adjacent the intake face of the primary filter media, a second portion secured to the first lateral side of the primary filter media, and a third portion secured to the second lateral side of the primary filter media;
wherein the second and third portions of the secondary filter media are compressed between the primary filter media and the first portion of housing; and
wherein the secondary filter media includes first and second lateral edges between an inwardly facing side and an outwardly facing side of the secondary filter media, the first and second lateral edges tapering downwardly away from the respective one of the first and second lateral sides of the primary filter media.

* * * * *